United States Patent [19]

Angadjivand et al.

[11] Patent Number: 6,119,691

[45] Date of Patent: *Sep. 19, 2000

[54] ELECTRET FILTER MEDIA

[75] Inventors: Seyed A. Angadjivand, Darlington, United Kingdom; Marvin E. Jones; Daniel E. Meyer, both of Stillwater, Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/865,362

[22] Filed: May 29, 1997

Related U.S. Application Data

[63] Continuation of application No. 08/591,217, Jan. 17, 1996, abandoned, which is a continuation of application No. 08/291,611, Aug. 17, 1994, Pat. No. 5,496,507, which is a continuation-in-part of application No. 08/107,517, Aug. 17, 1993, abandoned.

[51] Int. Cl.[7] ............................ A62B 18/02; A62B 23/02; A62B 7/10
[52] U.S. Cl. ............................ 128/206.19; 128/205.29; 55/DIG. 35; 55/DIG. 39
[58] Field of Search ................ 128/205.29, 206.19; 55/DIG. 35, DIG. 39

[56] References Cited

U.S. PATENT DOCUMENTS

| | | | |
|---|---|---|---|
| Re. 30,782 | 10/1981 | Van Turnhout | 264/22 |
| Re. 31,285 | 6/1983 | Van Turnhout et al. | 55/155 |
| 4,146,663 | 3/1979 | Ikeda et al. | 428/96 |
| 4,188,690 | 2/1980 | Suzuki et al. | 28/103 |
| 4,215,682 | 8/1980 | Kubik et al. | 128/205.29 |
| 4,363,682 | 12/1982 | Thiebault | 156/181 |
| 4,375,718 | 3/1983 | Wadsworth et al. | 29/592 E |
| 4,429,001 | 1/1984 | Kolpin et al. | 428/283 |
| 4,476,186 | 10/1984 | Kato et al. | 428/290 |
| 4,548,628 | 10/1985 | Miyake et al. | 55/487 |
| 4,588,537 | 5/1986 | Klasse et al. | 264/22 |
| 4,592,815 | 6/1986 | Nakao | 204/165 |

(List continued on next page.)

FOREIGN PATENT DOCUMENTS

| | | |
|---|---|---|
| 0 325 854 B1 | 4/1993 | European Pat. Off. ......... B03C 3/28 |
| 0325854B1 | 4/1993 | European Pat. Off. . |
| 5140849 | 6/1993 | Japan . |
| 568338 | 9/1970 | Russian Federation ....... A62B 18/02 |
| 2 176 404A | 12/1986 | United Kingdom . |

OTHER PUBLICATIONS

Brown, R.C., Air Filtration, pp. 122–128, Pergamon Press, Ltd. (1993).

Wente, V.A., et al., Manufacture of Superfine Organic Fibers, Report No. 4364 of the Naval Research laboratories, published May 25, 1954.

Wente, V.A., "Superfine Thermoplastic Fibers", Industrial Engineering Chemistry, vol. 48, pp. 1342–2346.

Davies, C.N., "The Separation of Airborne Dust and Particles", Institute of Mechanical Engineers, London, Proceedings 1B, 1952.

Kaminsky, S.L., et al., Means of Individual Protection of Respiratory Organs, Mashinostroyeniye, 1982, pp. 42–46, Moscow (English translation).

Primary Examiner—Joseph Weiss, Jr.
Attorney, Agent, or Firm—Carole Truesdale; Karl G. Schwappach; Karl G. Hanson

[57] ABSTRACT

An electret filter media, and mask, that is made of a nonwoven web of thermoplastic microfibers. The thermoplastic microfibers are of substantially the same composition, are nonconductive, and have an effective fiber diameter less than about 15 micrometers. The nonwoven web also has sufficient unpolarized trapped charge to exhibit an initial filtration quality factor of at least 0.31 when measured under the DOP Penetration and Pressure Drop Test.

18 Claims, 4 Drawing Sheets

U.S. PATENT DOCUMENTS

| | | | |
|---|---|---|---|
| 4,612,237 | 9/1986 | Frankenburg | 428/219 |
| 4,626,263 | 12/1986 | Inoue et al. | 55/155 |
| 4,729,371 | 3/1988 | Krueger | 128/206.19 |
| 4,775,579 | 10/1988 | Hagy et al. | 428/284 |
| 4,874,399 | 10/1989 | Reed et al. | 55/2 |
| 4,874,659 | 10/1989 | Ando et al. | |
| 4,883,052 | 11/1989 | Weiss et al. | 128/205.27 |
| 4,886,058 | 12/1989 | Brostrom et al. | 128/206.12 |
| 4,917,942 | 4/1990 | Winters | 55/155 |
| 4,944,854 | 7/1990 | Felton et al. | 204/168 |
| 5,028,465 | 7/1991 | Kinsley, Jr. | 428/36.3 |
| 5,051,159 | 9/1991 | Togashi et al. | 264/436 |
| 5,078,132 | 1/1992 | Braun et al. | 128/206.12 |
| 5,112,677 | 5/1992 | Tani et al. | 428/240 |
| 5,207,970 | 5/1993 | Joseph et al. | 264/518 |
| 5,227,172 | 7/1993 | Deeds | 425/72 |
| 5,244,482 | 9/1993 | Hassenboehler et al. | 55/528 |
| 5,246,637 | 9/1993 | Matsuura et al. | 264/24 |
| 5,256,176 | 10/1993 | Matsuura et al. | 55/528 |
| 5,280,406 | 1/1994 | Coufal et al. | 361/225 |
| 5,350,620 | 9/1994 | Sundet et al. | 428/172 |
| 5,472,481 | 12/1995 | Jones et al. | 96/15 |
| 5,496,507 | 3/1996 | Angadjivand et al. | 264/423 |

ELECTRET FILTER MEDIA

This application is a continuation of U.S. patent application Ser. No. 08/591,217 filed Jan. 17, 1996, which is a continuation of U.S. patent application Ser. No. 08/291,611 filed Aug. 17, 1994, now U.S. Pat. No. 5,496,507, which is a continuation-in-part of U.S. patent application Ser. No. 08/107,517 filed Aug. 17, 1993, now abandoned.

FIELD OF THE INVENTION

The invention concerns electret-enhanced filter media (more simply called "electret filters") made of fibers such as melt-blown microfibers. The invention concerns an improved method for making fibrous electret filters for removing particulate matter from air. The invention is especially concerned with respirators and improving the level of filtration-enhancing electrostatic charges on the filter media.

DESCRIPTION OF THE RELATED ART

For many years nonwoven fibrous filter webs have been made from polypropylene using melt-blowing apparatus of the type described in Report No. 4364 of the Naval Research Laboratories, published May 25, 1954, entitled "Manufacture of Super Fine Organic Fibers" by Van A. Wente et al. Such melt-blown microfiber webs continue to be in widespread use for filtering particulate contaminants, e.g., as face masks and as water filters, and for other purposes, e.g., as a sorbent web to remove oil from water, acoustic insulation and thermal insulation.

The filtration quality of a melt-blown microfiber web can be improved by a factor of two or more when the melt-blown fibers are bombarded as they issue from the die orifices with electrically charged particles such as electrons or ions, thus making the fibrous web an electret. Similarly, the web can be made an electret by exposure to a corona after it is collected. Melt-blown polypropylene microfibers are especially useful, while other polymers may also be used such as polycarbonates and polyhalocarbons that may be melt-blown and have appropriate volume-resistivities under expected environmental conditions.

Fibrous filters for removing particulate contaminants from the air are also made from fibrillated polypropylene films. Electret filtration enhancement can be provided by electrostatically charging the film before it is fibrillated.

Common polymers such as polyesters, polycarbonates, etc. can be treated to produce highly charged electrets but these charges are usually short-lived especially under humid conditions. The electret structures may be films or sheets which find applications as the electrostatic element in electro-acoustic devices such as microphones, headphones and speakers, in dust particle control, high voltage electrostatic generators, electrostatic recorders and other applications.

SUMMARY OF THE INVENTION

In one aspect, the present invention provides a method of charging a nonwoven web of thermoplastic microfibers to provide electret filter media comprising impinging on a nonwoven web of thermoplastic nonconductive microfibers capable of having a high quantity of trapped charge jets of water or a stream of water droplets at a pressure sufficient to provide the web with filtration enhancing electric charge and drying said web. Surprisingly, it has been found that merely by impinging these jets of water or stream of water droplets onto the nonwoven microfiber web, the web develops filtration enhancing electret charge. The charging can be further enhanced by subjecting the web to corona discharge treatment prior to impingement by the water. Preferably, the web is formed from melt blown polypropylene microfibers, poly(4-methyl-1-pentene) microfibers or blends thereof. The term "hydrocharging" will be used herein to describe this method.

The webs appear to be charged after impingement by jets of water or a stream of water droplets because when a hydrocharged web is exposed to unfiltered x-ray radiation, the filtration efficiency is markedly reduced.

The fibrous electret filter produced by the method of the present invention is especially useful as an air filter element of a respirator such as a face mask or for such purposes as home and industrial air-conditioners, air cleaners, vacuum cleaners, medical air line filters, and air conditioning systems for vehicles and common equipment such as computers, computer disk drives and electronic equipment. In respirator uses, the electret filters may be in the form of molded or folded half-face masks, replaceable cartridges or canisters, or prefilters. In such uses, an air filter element produced by the method of the invention is surprisingly effective for removing particulate aerosols. When used as an air filter, such as in a respirator, the electret filter media has surprisingly better filtration performance than does a comparable electret filter charged by known methods.

DETAILED DESCRIPTION OF THE INVENTION

Figure 1:
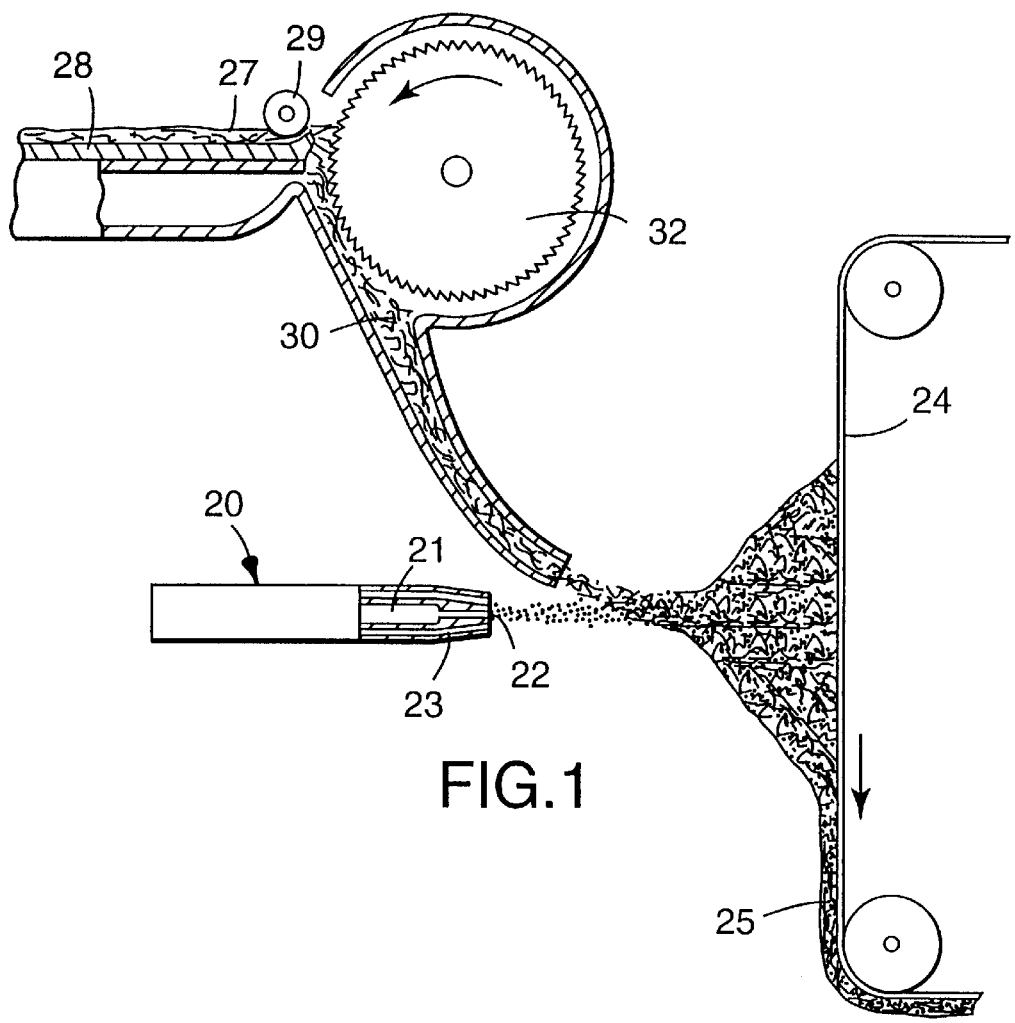
FIG. 1 is a side view of an apparatus useful in making the nonwoven microfiber web used in the method of the present invention.

The melt blown microfibers useful in the present invention can be prepared as described in Van A. Wente, "Superfine Thermoplastic Fibers," *Industrial Engineering Chemistry*, vol. 48, pp. 1342–1346 and in Report No. 4364 of the Naval Research Laboratories, published May 25, 1954, entitled "Manufacture of Super Fine Organic Fibers" by Van A. Wente et al.

The resin used to form the melt blown microfibers is a thermoplastic nonconductive, i.e., having a resistivity greater than $10^{14}$ ohm.cm, resin capable of having a high quantity of trapped charge. Preferred resins include polypropylene, poly(4-methyl-1-pentene) and blends thereof. The resin should be substantially free from materials such as antistatic agents which could increase the electrical conductivity or otherwise interfere with the ability of the fibers to accept and hold electrostatic charges. The melt blown microfibers can be of a single resin, formed of a resin blend, e.g., polypropylene and poly(4-methyl-1-pentene), or formed of two resins in layered or core/sheath configurations. When polypropylene and poly(4-methyl-1-pentene) are used in layered or core/sheath configurations, the poly (4-methyl-1-pentene) is preferably on the outer surface.

Blown microfibers for fibrous electret filters of the invention typically have an effective fiber diameter of from about 3 to 30 micrometers preferably from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Preferably, no more than about 90 weight percent staple fibers are present, more preferably no more than about 70 weight percent. Such webs containing staple fiber are disclosed in U.S. Pat. No. 4,118,531 (Hauser) which is incorporated herein by reference.

Sorbent particulate material such as activated carbon or alumina may also be included in the web. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.), which are incorporated herein by reference.

The electret filter media prepared according to the method of the present invention preferably has a basis weight in the range of about 10 to 500 g/m$^2$, more preferably about 10 to 100 g/m$^2$. In malting melt-blown microfiber webs, the basis weight can be controlled, for example, by changing either the collector speed or the die throughput. The thickness of the filter media is preferably about 0.25 to 20 mm, more preferably about 0.5 to 2 mm. The electret filter media and the polypropylene resin from which it is produced should not be subjected to any unnecessary treatment which might increase its electrical conductivity, e.g., exposure to gamma rays, ultraviolet irradiation, pyrolysis, oxidation, etc.

Nonwoven microfiber webs useful in the present invention may be prepared using an apparatus as shown in FIG. 1. Such an apparatus includes a die 20 which has an extrusion chamber 21 through which liquified fiber-forming material is advanced; die orifices 22 arranged in line across the forward end of the die and through which the fiber-forming material is extruded; and cooperating gas orifices 23 through which a gas, typically heated air, is forced at high velocity. The high velocity gaseous stream draws out and attenuates the extruded fiber-forming material, whereupon the fiber-forming material solidifies as microfibers during travel to a collector 24 to form web 25.

When staple fibers are present in the web, they may be introduced through use of a lickerin roll 32 disposed above the microfiber blowing apparatus as shown in FIG. 1. A web 27 of staple fibers, typically a loose, nonwoven web such as prepared on a garnet or RANDO-WEBBER apparatus, is propelled along table 28 under drive roll 29 where the leading edge engages against the lickerin roll 32. The lickerin roll 32 picks off fibers from the leading edge of web 27 separating the fibers from one another. The picked fibers are conveyed in an air stream through an inclined trough or duct 30 and into the stream of blown microfibers where they become mixed with the blown microfibers.

When particulate matter is to be introduced into the web it may be added using a loading mechanism similar to duct 30.

Hydrocharging of the web is carried out by impinging jets of water or a stream of water droplets onto the web at a pressure sufficient to provide the web with filtration enhancing electret charge. The pressure necessary to achieve optimum results will vary depending on the type of sprayer used, the type of polymer from which the web is formed, the thickness and density of the web and whether pretreatment such as corona charging was carried out prior to hydrocharging. Generally, pressures in the range of about 10 to 500 psi (69 to 3450 kPa) are suitable. Preferably the water used to provide the water droplets is relatively pure. Distilled or deionized water is preferable to tap water.

The jets of water or stream of water droplets can be provided by any suitable spray means. Those apparatus useful for hydraulically entangling fibers are generally useful in the method of the present invention, although operation is carried out at lower pressures in hydrocharging than generally used in hydroentangling.

Figure 2:
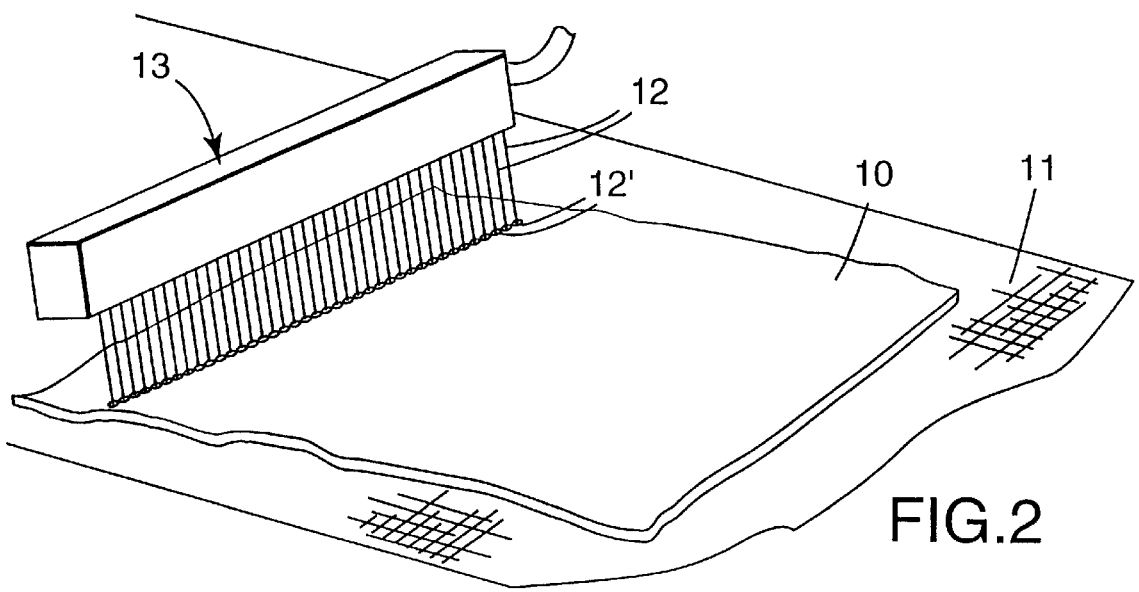
FIG. 2 is a perspective view of a water jet spray apparatus useful in the present invention.

An example of a suitable spray means is shown in FIG. 2 where fibrous web 10 is transported on support means 11. The transport means may be in the form of a belt, preferably porous, such as a mesh screen or fabric. Water jets 12 in water jet head 13 provide the water spray with a pump (not shown) providing the water pressure. Water jets 12 impinge on web 10 at impingement points 12'. Preferably, a vacuum is provided beneath a porous support to aid in passage of the spray through the web and to reduce drying energy requirements.

Figure 3:
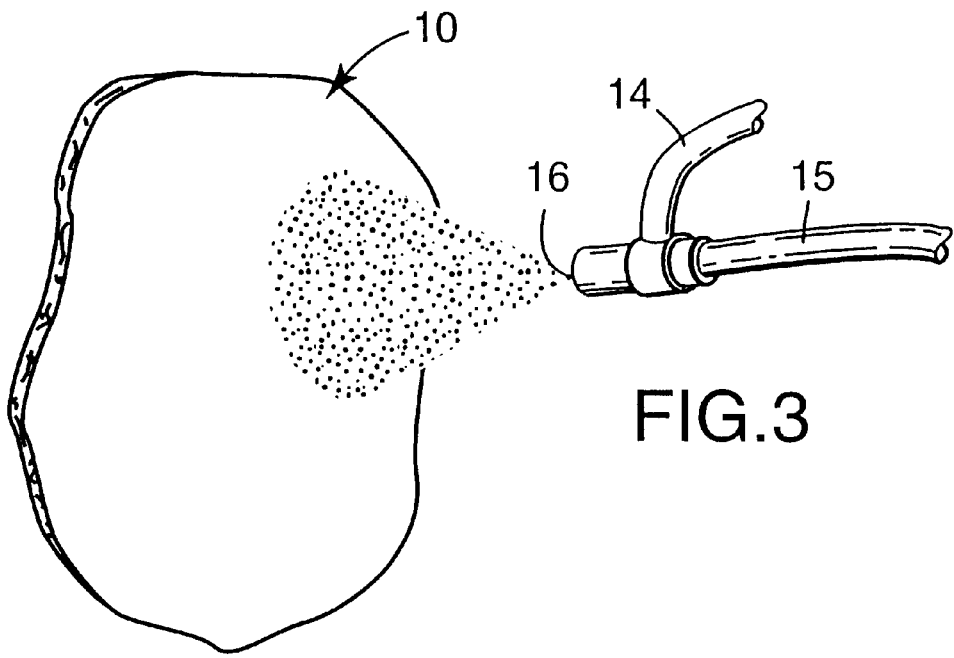
FIG. 3 is a perspective view of a nebulizer useful in the present invention.
Figure 4:
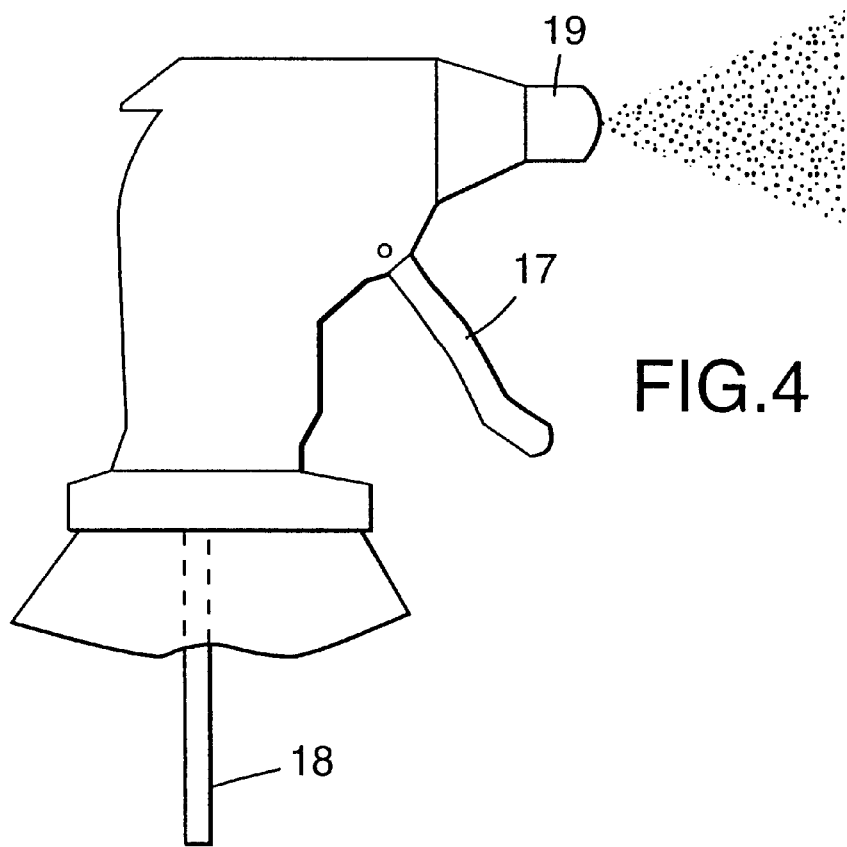
FIG. 4 is a perspective view of a pump action sprayer useful in the present invention.

Further examples of spray means suitable for use in the method of the present invention include nebulizers such as that shown in FIG. 3 wherein water provided through water line 14 and pressurized air provided through air line 15 are supplied to a nozzle 16 to provide a spray mist to impact web 10 and pump action sprayers such as that shown in FIG. 4 where a pump handle 17 forces water provided by water supply means 18 through nozzle 19 to provide a spray mist.

Figure 6:
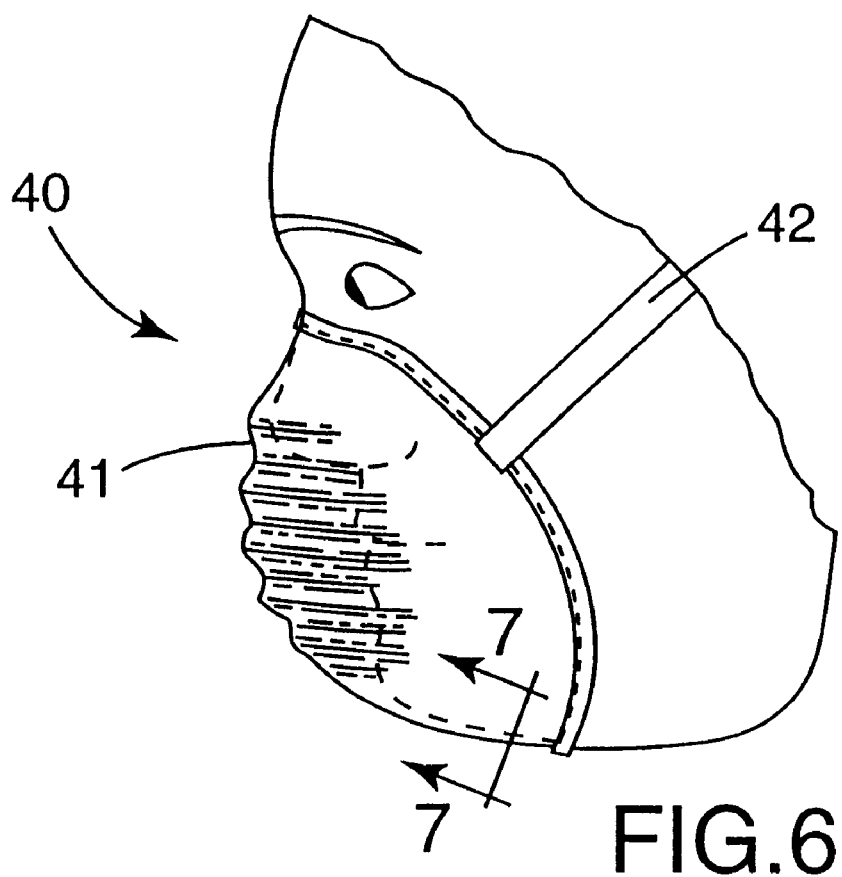
FIG. 6 is a side view of an example of a face mask that can use an electret filter media in accordance with the invention.

FIG. 6 shows a face mask 40 that has a cup-like shape that adapts it to fit over the nose and mouth of a person. The face mask 40 includes a mask body 41 and a strap 42 that supports the mask body on the person's face.

Figure 7:
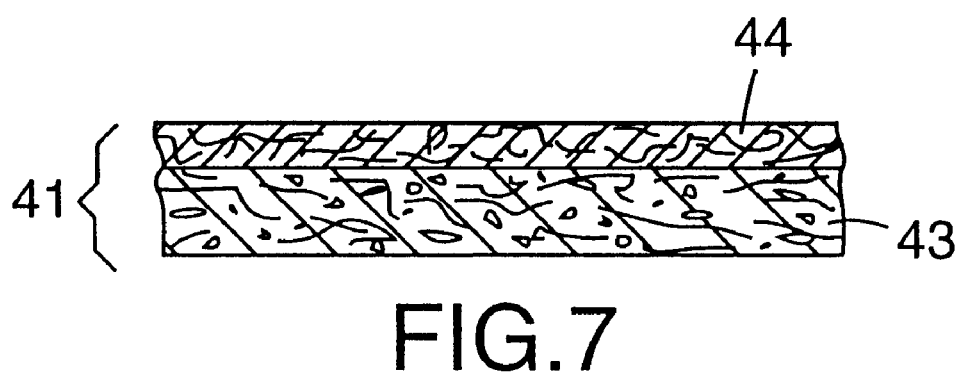
FIG. 7 is an enlarged sectional view taken along line 7—7 of FIG. 6.

The sectional view of the mask presented in FIG. 7 shows a sheet product of the invention 43 together with a liner 44 disposed over the sheet product. The sheet product may contain a web of entangled melt-blown organic polymeric microfibers produced in accordance with the invention.

In the following examples, all percentages and parts are by weight unless otherwise noted. The following test method was used to evaluate the examples.
DOP Penetration and Pressure Drop Dioctyl phthalate (DOP) 0.3 micrometer diameter particles at a concentration of between 70 and 110 mg/m$^3$ are generated using a TSI No. 212 sprayer with four orifices and 30 psi (207 kPa) clean air. The particles are forced through a sample of filter media which is 11.45 cm in diameter at a rate of 42.5 L/min, which is a face velocity of 6.9 centimeters per second. The sample was exposed to the aerosol for 30 seconds. The penetration is measured with an optical scattering chamber, Percent Penetration Meter Model TPA- 8F available from Air Techniques Inc. The DOP penetration is preferably less than about 70%, more preferably less than about 40%. The pressure drop is measured at a flow rate of 42.5 L/min and a face velocity of 6.9 cm/sec using an electronic manometer. Pressure drop is reported as ΔP in mm of water. Preferably the pressure drop is less than about 4 mm of water, more preferably less than about 3 mm of water for a single layer of web.

The penetration and pressure drop are used to calculate a quality factor "QF value" from the natural log (ln) of the DOP penetration by the following formula:

$$QF\ [1/\text{mm H}_2\text{O}] = \frac{-\text{Ln}\left[\frac{\text{DOP Penetration (\%)}}{100}\right]}{\text{Pressure Drop [mm H}_2\text{O]}}$$

A higher initial QF value indicates better initial filtration performance. Decreased QF values effectively correlate with decreased filtration performance. Generally a QF value of at least about 0.25 is preferred, a value of at least about 0.5 is more preferred and a value of at least about 1 is most preferred.

Cigarette Smoke Adsorption Test

The cigarette smoke adsorption test was performed in a test chamber having rectangular dimensions with a volume of 1 m³ which contained an aspirator (CAM 770 Room Air Cleaner, Norelco Company) fitted with a flat filter sample (14 cm×14 cm). A smoker device capable of smoking a predetermined number of cigarettes (1–10) emitted smoke within the test chamber during a controlled burn time of 4 to 5 minutes. A fan provided uniform mixing of the cigarette smoke generated within the test chamber. A laser particle counter (Model PMS LAS-X from Particle Measurement System, Colorado) having a sampling flow rate of 5 cc/sec and a detection range of 0.1 to 7.5 micrometer particle size monitored the particle concentration per count within the test chamber environment. The particle trapping efficiency and the pressure drop of the filter samples were measured before and after the adsorption of the cigarette smoke.

The particle trapping efficiency of the filter media was measured using a TSI AFT-8110 automated filter tester (TSI, St. Paul, Minn.) with NaCl particles and a face velocity of air passing through the sample of 26.7 cm/sec. The concentration of the NaCl particles, $C_{in}$ and $C_{OUT}$, at positions upstream and downstream, respectively, of the filter samples were measured using the photometer in the TSI AFT-8110 and the particle trapping efficiency, E, of the filter was calculated using the formula:

$$E = (1 - [C_{OUT}/C_{in}]) \times 100\%.$$

Ambient Air Particle Loading Test

Filter samples were subjected to ambient air at a flow rate of 149 ft³/min (250 m³/hr) for extended periods of time using samples 300 mm×116 mm and then challenged with particles of 0.3 micrometers and 1.0 micrometers in size. The resultant particle trapping efficiencies were measured as described in the cigarette smoke adsorption test both prior to the challenge and after designated ambient air loading times.

Examples 1–7 and Comparative Examples C1–C2

A polypropylene (ESCORENE 3505G, available from Exxon Corp.) microfiber web was prepared as described in Wente, Van A., "Superfine Thermoplastic Fibers," *Industrial Engineering Chemistry*, vol. 48, pp. 1342–1346. The web had a basis weight of 55 g/m² and a thickness of 0.1 cm. The effective fiber diameter of the fibers was 7.6 μm. Samples of the web were subjected to impingement of water jets provided by a hydroentangler (Laboratory Model, serial no. 101, available from Honeycomb Systems Corp.), similar to that shown in FIG. 1, which had a spray bar width of 24 in (0.6 m) with 40 spray orifices, each 0.005 in (0.13 mm) in diameter, per inch (2.5 cm) width at various water pressures as set forth in Table 1. Each sample passed beneath the spray bar at a rate of 3.5 m/min, and was treated once on each face, vacuum extracted and dried at 70° C. for one hour. The treated samples were tested for DOP penetration and pressure drop and the quality factor was calculated. The penetration (Pen) and quality factor (QF) are reported in Table 1.

TABLE 1

| Example | Pressure (kPa) | Pen (%) | QF |
|---|---|---|---|
| C1 | 34.5 | 78 | 0.09 |
| C2 | 69 | 72 | 0.11 |
| 1 | 172 | 39 | 0.31 |
| 2 | 345 | 32 | 0.37 |
| 3 | 690 | 35 | 0.34 |
| 4 | 1380 | 39 | 0.34 |
| 5 | 2070 | 43 | 0.34 |
| 6 | 2760 | 46 | 0.31 |
| 7 | 3450 | 46 | 0.34 |

As can be seen from the data in Table 1, hydrocharging (at pressures of at least about 170 kPa) develops useful levels of electret enhanced filtration characteristics in this web.

Examples 8–15 and Comparative Examples C3–C4

A web was prepared as in Examples 1–7 and subjected to corona treatment by passing the web, in contact with an aluminum ground plane, under a positive DC corona twice at a rate of 1.2 m/min with the current maintained at about 0.01 mA/cm corona source and the corona source was about 4 cm from the ground plate. Samples of this web were then subjected to impingement of water jets as in Examples 1–7 at various pressures as set forth in Table 2. The treated samples were tested for DOP penetration and pressure drop and the quality factor was calculated. The penetration (Pen) and quality factor (QF) are reported in Table 2.

TABLE 2

| Example | Pressure (kPa) | Pen (%) | QF |
|---|---|---|---|
| C3 | 0 | 27 | 0.38 |
| C4 | 69 | 21 | 0.46 |
| 8 | 172 | 16 | 0.55 |
| 9 | 345 | 15 | 0.57 |
| 10 | 690 | 15 | 0.61 |
| 11 | 1380 | 15 | 0.66 |
| 12 | 2070 | 13 | 0.80 |
| 13 | 2760 | 14 | 0.79 |
| 14 | 3450 | 18 | 0.75 |
| 15 | 4140 | 25 | 0.61 |

As can be seen from the data in Table 2, hydrocharging (at pressures greater than about 170 kPa) increased the electret filtration characteristics of this web.

Examples 16–21 and Comparative Example C5

A web was prepared as in Examples 1–7 except the polymer used was poly-4-methyl-1-pentene (TPX MX-007, available from Mitsui Chemical Co. The web was subjected to corona treatment as in Examples 8–15. In Examples 16–21, samples of this web were then subjected to impingement of water droplets as in Examples 1–7 at various pressures as set forth in Table 3. The treated samples were tested for DOP penetration and pressure drop and the quality factor was calculated. The penetration (Pen) and quality factor (QF) are reported in Table 3.

TABLE 3

| Example | Pressure (kPa) | Pen (%) | QF |
| --- | --- | --- | --- |
| C5 | 0 | 19 | 0.85 |
| 16 | 69 | 11 | 1.31 |
| 17 | 172 | 2.1 | 2.06 |
| 18 | 345 | 2.0 | 2.06 |
| 19 | 1035 | 2.9 | 1.97 |
| 20 | 1380 | 3.1 | 1.75 |
| 21 | 2760 | 11 | 1.12 |

As can be seen from the data in Table 3, hydrocharging poly-4-methyl-1-pentene webs at pressures of about 69 kPa and greater produced webs having excellent electret enhanced filtration characteristics.

Examples 22–24 and Comparative Examples C6–C8

In Examples 22–24 and Comparative Examples C6–C8, polypropylene (ESCORENE 3505G) microfiber webs containing 50 weight percent staple fiber were prepared as described in U.S. Pat. No. 4,118,531 (Hauser). Each web weighed about 50 g/m². In Example 22 and Comparative Example C6, the staple fiber was 17 denier, 5.1 cm long polypropylene, natural, available from Synthetic Industries (17d PP); in Example 23 and Comparative Example C7, the staple fiber was 15 denier, 3.1 cm polyester, KODEL K431 available from Eastman Chemical Company (15d PET); and in Example 24 and Comparative Example C8, the staple fiber was 6 denier, 5.1 cm polyester, KODEL K-211 available from Eastman Chemical Company (6d PET). Prior to use, the polyester staple fibers were washed to remove surface finish using about 2 weight percent LIQUINOX (available from Alconox, Inc.) in hot water (about 140° F., 60° C.) with agitation for about 5 minutes, rinsed and dried.

Samples of each web were subjected to corona treatment as described in Examples 8–15. In Examples 22–24, the webs were subsequently subjected to impingement of water spray as in Examples 1–7 at a rate of 3.5 m/min with a hydrostatic pressure of 690 kPa. The treated samples were tested for DOP penetration and pressure drop and the quality factor was calculated. The penetration (Pen) and quality factor (QF) are reported in Table 4.

TABLE 4

| Example | Fiber Type | Pen (%) | QF |
| --- | --- | --- | --- |
| 22 | 17d PP | 49 | 1.67 |
| 23 | 15d PET | 44 | 2.24 |
| 24 | 6d PET | 47 | 1.82 |
| C6 | 17d PP | 68 | 0.95 |
| C7 | 15d PET | 72 | 0.97 |
| C8 | 6d PET | 76 | 0.82 |

As can be seen from the data in Table 4, hydrocharging webs of mixtures of melt blown microfibers and staple fibers after corona treatment increases the Quality Factor when compared to webs treated only with corona charging. The most significant increase was seen in the web containing 50 percent 15 denier polyester staple fiber.

Examples 25–26 and Comparative Example C9

A polypropylene web was prepared as in Examples 1–7. The web had a basis weight of 54 g/m² and a thickness of 1.04 mm. The effective fiber diameter was 7.5 µm. In Comparative Example C9, a sample of the web was corona charged as in Examples 8–15. In Example 25, a sample was hydrocharged using a nebulizer (Model SCD 052H, available from Sonic Development Corp., resonator cap removed) with an air pressure of 380 to 414 kPa and water at atmospheric pressure at a distance of about 7 to 12 cm on each side. In Example 26, a sample was corona charged as in Comparative Example C9 and then hydrocharged as in Example 25. The treated samples were tested for DOP penetration and pressure drop and the quality factor was calculated. The penetration (Pen) and quality factor (QF) are reported in Table 5.

TABLE 5

| Example | Pen (%) | QF |
| --- | --- | --- |
| C9 | 25 | 0.56 |
| 25 | 45.5 | 0.36 |
| 26 | 21 | 0.67 |

As can be seen from the data in Table 5, hydrocharging this web with the nebulizer (Example 25) provided enhanced filtration characteristics although the Quality Factor was not as high as that charged only with corona charging (Comparative Example C9). Hydrocharging with the nebulizer after corona treatment provided the highest Quality Factor in the examples in Table 5.

Example 27 and Comparative Example C10

A web was prepared as in Examples 1–7 except the polymer used was a pellet blend of 75% polypropylene (FINA 3860X, available from Fina Oil & Chemical Co.) and 25% poly(4-methyl-1-pentene) (TPX MX-007, available from Mitsui Chemical Co.). The web was 1.0 mm thick and had a basis weight of 55 g/m². The effective fiber diameter was 8.1 µm. In Example 27, a sample of the web was subjected to corona treatment and then to impingement of jets of water as in Examples 8–15 using water pressure of 345 kPa (50 psi). In Comparative Example C10, a sample was subjected to only corona treatment. The treated samples were tested for DOP penetration and pressure drop and the quality factor was calculated. The penetration (Pen) and quality factor (QF) are reported in Table 6.

TABLE 6

| Example | Pen (%) | QF |
| --- | --- | --- |
| 27 | 6.8 | 1.16 |
| C10 | 29 | 0.51 |

As can be seen from the data in Table 6, hydrocharging significantly enhanced the filtration characteristics of the web of Example 27 over that of the web of Comparative Example C10 which was only corona charged.

Example 28

A polypropylene/poly(4-methyl-1-pentene) multilayer microfiber was prepared as in Examples 1–7 except the apparatus utilized two extruders and a three-layer feedblock (splitter assembly) following the method for forming microfiber webs having layered fibers as described in U.S. Pat. No. 5,207,970 (Joseph et al.) which is incorporated herein by reference. The first extruder delivered a melt stream of a 50 melt flow rate polypropylene resin, available from FINA Oil and Chemical Co., to the feedblock assembly which heated the resin to about 320° C. The second extruder, which heated the resin to about 343° C, delivered a melt stream of poly(4-methyl-1-pentene) supplied as TPX˜ grade MX-007 by Mitsui Petrochemical Industries, Ltd. to the feedblock. The feedblock split the two polymer streams. The polymer melt streams were merged in an alternating fashion into a three-layer melt stream on exiting the feedblock, with the outer layers being the poly(4-methyl-1-pentene) resin. The gear pumps were adjusted so that a 75:25 pump ratio of polypropylene:poly(4-methyl-1-pentene) polymer melt was delivered to the feedblock assembly. Webs were collected at a collector to die distance of 28 cm (11 in.). The resulting web of three-layer microfibers had an effective fiber diameter of less than about 8 micrometers and a basis weight of 55 g/m². The web was subjected to corona treatment as described in Examples 8–15, then, to impingement of water as described in Examples 1–7 using a water pressure of 345 kPa. The web was then subjected to vacuum extraction and dried at 70° C. for one hour. The pressure drop and penetration were measured on the web before impingement of water jets (corona treatment only) and after both corona treatment and impingement with water jets and the quality factor was calculated. The penetration and quality factor are reported in Table 7.

Example 29

A web having a basis weight of 55 g/m² and comprising three-layer microfibers having an effective fiber diameter less than about 8 micrometers was prepared as in Example 28, except the polypropylene and the poly(4-methyl-1-pentene) melt streams were delivered to the three-layer feedblock at a 50:50 ratio and the collector to die distance was 23 cm (9 inches). The resulting web was corona treated and subsequently subjected to impingement of water jets and dried as in Example 28. The pressure drop and penetration were measured on webs before impingement of water jets (corona treatment only) and after both corona treatment and impingement with water jets and the quality factor was calculated. The penetration and quality factor are reported in Table 7.

Example 30

A web having a basis weight of 55 g/m² and comprising three-layer microfibers having an effective fiber diameter less than about 8 micrometers was prepared as in Example 28, except the polypropylene and poly(4-methyl-1-pentene) melt streams were delivered to the three-layer feedblock in a 25:75 ratio and the collector to die distance was 7.5 inches (19 cm). The resulting web was corona treated and subsequently subjected to impingement of water jets and dried as in Example 28. The pressure drop and penetration were measured on webs before impingement of water jets (corona treatment only) and after both corona treatment and impingement with water jets and the quality factor was calculated. The penetration and quality factor are reported in Table 7.

Example 31

A web of the poly(4-methyl-1-pentene) was prepared as in Example 28, except only one extruder, which heated the resin to 343° C., was used. The extruder was connected directly to the die through a gear pump. The collector distance from the die was 19 cm (7.5 inches). The resulting web having an effective fiber diameter of 8.5 micrometers and a basis weight of 55 g/m² was corona treated and subsequently subjected to impingement of water jets and dried as in Example 28. The pressure drop and penetration were measured on webs before impingement of water jets (corona treatment only) and after both corona treatment and impingement with water jets and the quality factor was calculated. The penetration and quality factor are reported in Table 7.

Example 32

A web having a basis weight of 55 g/m² and comprising three-layer microfibers having an effective fiber diameter less than about 8 micrometers was prepared as in Example 28, except the second extruder delivered a melt stream of a pellet blend of 50 melt flow polypropylene resin, available from FINA, and poly(4-methyl-1-pentene) resin (Mitsui "TPX" grade MX-007) to the feedblock. The polymer melt streams were merged in an alternating fashion into a three layer melt stream, with the outer layers being pellet blend (75 weight percent polypropylene:25 weight percent poly (4-methyl-1-pentene). The gear pumps were adjusted to deliver a 50:50 weight ratio of polypropylene:pellet blend polymer melt to the feed block assembly. The collector distance from the die was 19 cm (7.5 in). The resulting web was corona treated and subsequently subjected to impingement of water jets and dried as per Example 28 treatment. The pressure drop and penetration were measured on webs before impingement of water jets (corona treatment only) and after both corona treatment and impingement with water jets and the quality factor was calculated. The penetration and quality factor are reported in Table 7.

TABLE 7

| Example | Pen % Corona Only | QF Corona Only | Pen % Corona + Water Jet Impingement | QF Corona + Water Jet Impingement |
|---|---|---|---|---|
| 28 | 19.7 | 0.75 | 3.7 | 1.45 |
| 29 | 15.4 | 0.8 | 6.3 | 1.30 |
| 30 | 15.6 | 0.9 | 4.8 | 1.49 |
| 31 | 19.4 | 0.73 | 2.5 | 1.52 |
| 32 | 39.0 | 0.42 | 9.1 | 1.2 |

As can be seen from the data in Table 7, the webs containing fibers having outer layers of, or containing poly (4-methyl-1-pentene), showed excellent levels of enhanced filtration characteristics when subjected to both corona treatment and impingement of water jets.

Example 33

A web having a basis weight of 63 g/m² and comprising five-layer microfibers having an effective fiber diameter of less than about 10 micrometers was prepared as in Example 28 except that the polypropylene and poly(4-methyl-1-pentene) melt streams were delivered to the five-layer feedblock in a 50:50 weight ratio. The polymer melt streams were merged in an alternating fashion into a five-layer melt stream on exiting the feedblock, with the outer layers being the poly(4-methyl-1-pentene) resin. The resultant web was subjected to corona treatment by passing the web, in contact with an aluminum ground plate, under six positive DC corona sources, sequentially at a rate of 7 m/min with the current maintained at about 0.05 mA/cm and the corona source was about 7 cm from the ground plate. The corona treated web was then subjected to impingement of water jets as in Example 28 except the water pressure was 690 kPa. The web was vacuum extracted and dried in a through-air drier at 82° C. for about 45 seconds. The pressure drop and, penetration were measured on webs before impingement of water jets (corona treatment only) and after both corona treatment and impingement with water jets and the quality factor was calculated. The penetration and quality factor are reported in Table 8.

Example 34

A web having a basis weight of 62 g/m$^2$ and comprising five-layer microfibers having an effective fiber diameter less than about 10 micrometers was prepared as in Example 28, except only one extruder, which heated the resin to 340° C. was used. The extruder delivered a melt stream of a pellet blend containing 50 weight percent 50 melt flow polypropylene resin and 50 weight percent poly(4-methyl-1-pentene) (Mitsui "TPX" grade MX-007) to the feedblock. The resulting web was corona treated and also subsequently subjected to impingement of water jets and dried as in Example 33. The pressure drop and penetration were measured on webs before impingement of water jets (corona treatment only) and after both corona treatment and impingement with water jets and the quality factor was calculated. The penetration and quality factor are reported in Table 8.

Example 35

A web having a basis weight of 62 g/m$^2$ and comprising five-layer microfibers having an effective fiber diameter of less than about 10 micrometers was prepared as in Example 33 except the second extruder delivered a melt stream of a poly(4-methyl-1-pentene) supplied as "TPX" grade DX820 by Mitsui Petrochemical Industries, Ltd., to the feedblock. The polymer melt streams were merged in an alternating fashion into a five layer melt stream, with the outer layers being poly(4-methyl-1-pentene). The gear pumps were adjusted to deliver a 50:50 weight ratio of the polypropylene:poly(4-methyl-1-pentene) polymer melt to the feed block assembly. The resulting web was corona treated and also subsequently subjected to impingement of water jets and dried as in Example 33. The pressure drop and penetration were measured on webs before impingement of water jets (corona treatment only) and after both corona treatment and impingement with water jets and the quality factor was calculated. The penetration and quality factor are reported in Table 8.

Example 36

A web having a basis weight of 59 g/m$^2$ and comprising five-layer microfibers having an effective fiber diameter of less than about 10 micrometers was prepared as in Example 28 except the second extruder delivered a melt stream of a pellet blend of 80 weight percent 50 melt flow polypropylene resin and 20 weight percent poly(4-methyl-1-pentene) (Mitsui "TPX" grade MX-007) to the feedblock. The polymer melt streams were merged in an alternating fashion into a five layer melt stream, with the outer layers being the pellet blend. The gear pumps were adjusted to deliver a 50:50 weight ratio of the polypropylene:pellet blend polymer melt to the feed block assembly. The resulting web was corona treated and also subsequently subjected to impingement of water jets and dried as in Example 33. The pressure drop and penetration were measured on webs before impingement of water jets (corona treatment ,only) and after both corona treatment and impingement with water jets and the quality factor was calculated. The penetration and quality factor are reported in Table 8.

Example 37

A web of poly(4-methyl-1-pentene) (Mitsui "TPX" grade MX-007) was prepared utilizing a five layer melt stream as in Example 28, except only one extruder which heated the resin to 343° C., was used. The extruder was connected directly to the die through a gear pump. The resulting web was corona treated and subsequently subjected to impingement of water jets and dried as in Example 33. The basis weight was 65 g/m$^2$ and the effective fiber diameter was less than 10 micrometers. The pressure drop and penetration were measured on webs before impingement of water jets (corona treatment only) and after both corona treatment and impingement with water jets and the quality factor was calculated. The penetration and quality factor are reported in Table 8.

TABLE 8

| Example | Pen % Corona Only | QF Corona Only | Pen % Corona + Water Jet Impingement | QF Corona + Water Jet Impingement |
|---|---|---|---|---|
| 33 | 26.7 | 0.66 | 7.8 | 1.31 |
| 34 | 28.7 | 0.49 | 11.8 | 0.94 |
| 35 | 25.8 | 0.55 | 9.3 | 1.01 |
| 36 | 26.4 | 0.56 | 13.7 | 0.9 |
| 37 | 25.2 | 0.51 | 7.1 | 1.24 |

Examples 38a–d, 39a–d and 40a–d

Circular filter layers 10.16 cm in diameter and 1.3 mm thick were prepared from web materials prepared as described in Example 35 for Examples 38a–d, Example 36 for Examples 39a–d and Example 37 for Examples 40a–d. Circular filter elements were assembled of various numbers of layers, as indicated in Table 9, of charged electret filter media as in U.S. Pat. No. 4,886,058 (Brostrom et al.) for the front and rear walls of the filter element. Each assembled filter element had a singular, circular polypropylene breather tube having an inner diameter of 1.91 cm. The filter elements were subjected to the DOP penetration and pressure drop test. The results are reported in Table 9.

Examples 41a–e

A web of 50 melt flow polypropylene resin was prepared as in Example 33, except that only one extruder, which heated the resin to 320° C. was used, and it was connected directly to the die though a gear pump. The resulting web had a basis weight of 55 g/m$^2$ and an effective fiber diameter of less than about 8 micrometers. The resulting web was corona treated and also subsequently subjected to impingement of water jets and dried as in Example 33.

Filter elements containing various numbers of layers of the electret web were prepared and tested as in Examples 38–40. The results are set forth in Table 9.

Comparative Example C11

A web of 50 melt flow polypropylene resin was prepared as in Example 41 except the resultant web was only corona treated. A filter element using six layers of electret filter media was assembled and tested as in Examples 38–40. The results are set forth in Table 9.

TABLE 9

| Ex. | Layers of Filter Media per wall | Initial Penetration (%) | Initial Pressure Drop (mm H$_2$O) | Loaded Penetration (%) | Loaded Pressure Drop (mm H$_2$O) |
|---|---|---|---|---|---|
| 38a | 5 | 0.001 | 18.5 | 0.001 | 18.9 |
| b | 4 | 0.001 | 15.4 | 0.003 | 15.9 |
| c | 3 | 0.007 | 12.4 | 0.018 | 12.8 |
| d | 2 | 0.161 | 9.6 | 0.529 | 9.8 |
| 39a | 5 | 0.002 | 17.6 | 0.006 | 18.0 |
| b | 4 | 0.013 | 13.8 | 0.032 | 14.1 |

TABLE 9-continued

| Ex. | Layers of Filter Media per wall | Initial Penetration (%) | Initial Pressure Drop (mm H$_2$O) | Loaded Penetration (%) | Loaded Pressure Drop (mm H$_2$O) |
|---|---|---|---|---|---|
| c | 3 | 0.114 | 11.9 | 0.294 | 12.4 |
| d | 2 | 0.840 | 8.9 | 2.15 | 9.3 |
| 40a | 5 | 0.001 | 23.3 | 0.001 | 23.8 |
| b | 4 | 0.001 | 18.4 | 0.001 | 18.9 |
| c | 3 | 0.080 | 14.5 | 0.017 | 14.9 |
| d | 2 | 0.167 | 10.8 | 0.311 | 11.1 |
| 41a | 6 | 0.001 | 21.4 | 0.001 | 21.8 |
| b | 5 | 0.001 | 16.7 | 0.002 | 17.0 |
| c | 4 | 0.001 | 15.0 | 0.021 | 15.3 |
| d | 3 | 0.007 | 12.0 | 0.237 | 12.4 |
| e | 2 | 0.177 | 9.1 | 3.37 | 9.4 |
| C11 | 6 | 0.015 | 17.7 | 0.127 | 17.4 |

The data demonstrates that water jet impingement upon a corona treated microfiber filter media of either polypropylene fiber, multilayer fiber construction of polypropylene with poly-4-methyl-1-pentene, and fibers of poly-4-methyl-1-pentene permits less penetration of DOP both initially and at final loading compared with polypropylene microfiber 6-layer construction subjected only to corona treatment. Therefore, filter elements utilizing the water impingement treated microfiber media can be made with fewer layers of media and lower pressure drop across the filter element can result while the filter element still offers comparable or superior performance levels to corona treated electret filter media having a greater number of layers.

Example 42

A filter sample was prepared as in Example 31 except the collector to die distance was 40 cm (16 in), the resin was heated to 372° C., the effective fiber diameter was 14 micrometers, the basis weight was 50 g/m$^2$, and the web was dried at 80° C. for about 25 min. The pressure drop was measured. The sample was subjected to the cigarette smoke test and filter efficiency was determined. The results are shown in Table 10.

Example 43

A filter was prepared as in Example 42 except TPX™ grade MX-002 poly(4-methyl-1-pentene) was used. The pressure drop was measured. The sample was subjected to the cigarette smoke test and filter efficiency was determined. The results are shown in Table 10.

TABLE 10

| Ex. | Pressure drop (mm H$_2$O) at 26.7 cm/sec | Uncharged Filter Efficiency $E_{uc}$ (%) | Initial Filter Efficiency $E_t$ (%) | Filter Efficiency After 1 Cigarette $E_t$ (%) | Filter Efficiency After 5 Cigarettes $E_t$ (%) | Filter Efficiency After 10 Cigarettes $E_t$ (%) |
|---|---|---|---|---|---|---|
| 42 | 2.8 | 16.5 | 80.5 | — | 48.8 | 17.9 |
| 43 | 3.4 | 18.6 | 67.1 | 60.3 | 53.9 | 34.4 |

The data in Table 10 illustrates the superior filtration performance of the filters made from poly(4-methyl-1-pentene) and treated by the combination of corona and water impingement.

Examples 44a and 44b

A filter sample was prepared as in Example 31 except the collector to die distance was 11 inches (28 cm) and the effective fiber diameter was 14 micrometers. The web had a basis weight of 40 g/m$^2$ and a thickness of 1.2 mm (0.049 in). A pleated filter element was prepared from the filter web and a scrim of Colback˙ (80 g/m$^2$, available from BASF Corp.) which had been adhesively adhered to the filter web using about 1 g/m$^2$ adhesive. The filter element was 29 cm long, 10 cm wide and had 52 pleats in its 29 cm length with the pleats having a height of 28 mm. The web was tested for initial efficiency and pressure drop values as well as for the filter efficiency after ambient air particle loading at particle sizes of 0.3 micrometer diameter (Example 44a) and 1 micrometer diameter (Example 44b). The results are shown in Table 11.

TABLE 11

| Ex. | Particle Size (um) | Initial Efficiency (%) | Initial Pressure Drop (mm H₂O) | 133 Hour exposure Efficiency (%) | 133 Hour exposure Pressure Drop (mm H₂O) | 290 Hour exposure Efficiency (%) | 290 Hour exposure Pressure Drop (mm H₂O) |
| --- | --- | --- | --- | --- | --- | --- | --- |
| 44a | 0.3 | 70.5 | 10.8 | 53.8 | 13.8 | 47 | 15.5 |
| 44b | 1.0 | 86.8 | 10.8 | 79.0 | 13.8 | 75 | 15.5 |

The data in Table 11 demonstrates that the particle trapping efficiency an be sustained for long periods even under conditions of continuous use with range of particle sizes.

Figure 5A:
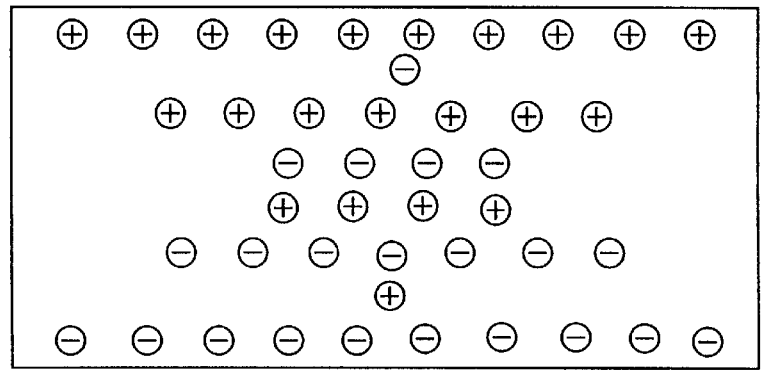
FIG. 5A is an idealized cross-sectional view of a web illustrating a polarized charge resulting from corona charging.
Figure 5B:
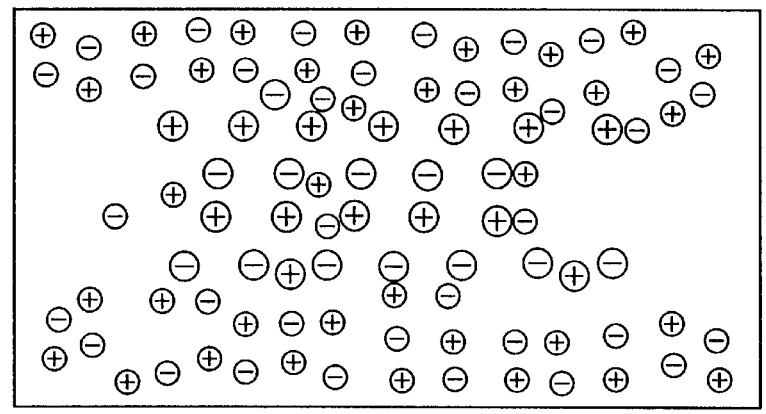
FIG. 5B is an idealized cross-sectional view of a web illustrating both polarized and unpolarized charge resulting from corona charging and hydrocharging.
Figure 5C:
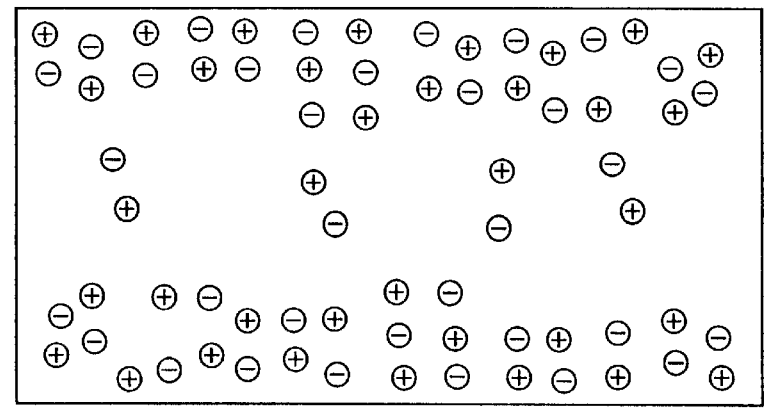
FIG. 5C is an idealized cross-sectional view of a web illustrating unpolarized charge resulting from hydrocharging.

Electric charge in webs may be polarized, unpolarized, or a combination thereof, depending upon the composition of the web and the method by which the web is charged. FIGS. 5A–C are idealized cross-sectional illustrations of the charge configurations in webs subject to 1) corona charging, 2) corona charging pre-treatment followed by hydrocharging, and 3) hydrocharging with no pre-treatment. One side of the corona charged web of FIG. 5A has a predominantly positive charge, and the other side has a predominantly negative charge producing a net polarization along the thickness of the web. Pre-treating the web with corona charging followed by hydrocharging produces a combination of polarized and unpolarized charge, as illustrated in FIG. 5B. The macroscopic polarization of the web of FIG. 5B is significantly less than that of the pure corona charged web of FIG. 5A. An external discharge current is observable by thermally stimulated discharge for samples that contain electric charges with a net polarization normal to the plane of the electrodes, such as with corona charged samples of FIGS. 5A and 5B.

The hydrocharged web of FIG. 5C illustrates unpolarized positive and negative trapped charge dispersed throughout the thermoplastic fibers. The randomly deposited, unpolarized charge produces almost zero net polarization across the media. Little or no external discharging current is detectable using thermally stimulated discharge.

The various modifications and alterations of this invention will be apparent to those skilled in the art without departing from the scope and spirit of this invention and this invention should not be restricted to that set forth herein for illustrative purposes.

What is claimed is:

1. Electret filter media that comprises:
    a nonwoven web that contains thermoplastic microfibers that are of substantially the same composition, that are nonconductive, and that have an effective fiber diameter less than about 15 micrometers,
    the web also has sufficient unpolarized trapped charge such that the web exhibits an initial filtration quality factor of at least 0.31 under the DOP Penetration and Pressure Drop Test.

2. The electret filter media of claim 1 wherein the thermoplastic microfibers contain polypropylene.

3. The electret filter media of claim 1 wherein the thermoplastic microfibers contain poly-4-methyl-1-pentene.

4. The electret filter media of claim 1 wherein the thermoplastic microfibers contain a blend of thermoplastic materials.

5. The electret filter media of claim 1 which has substantially no net polarization of the charge normal to a plane of the web.

6. The electret filter media of claim 1 which exhibits substantially no discharge current when subjected to thermally stimulated discharge.

7. The electret filter media of claim 1 which exhibits a quality factor of at least 0.37 under the DOP Penetration and Pressure Drop Test.

8. The electret filter media of claim 1 which exhibits a quality factor of at least 0.55 under the DOP Penetration and Pressure Drop Test.

9. The electret filter media of claim 1 which exhibits a quality factor of at least 0.66 under the DOP Penetration and Pressure Drop Test.

10. The electret filter media of claim 1 which exhibits a quality factor of at least 0.80 measured using the DOP Penetration and Pressure Drop Test.

11. The electret filter media of claim 1 which exhibits a quality factor of at least 1.12 measured using the DOP Penetration and Pressure Drop Test.

12. The electret filter media of claim 1, wherein the thermoplastic microfibers have been subjected to corona treatment and to water contact to impart trapped charge to the web.

13. The electret filter media of claim 1, wherein the thermoplastic microfibers are meltblown thermoplastic microfibers.

14. The electret filter media of claim 13, wherein the meltblown thermoplastic microfibers have an effective fiber diameter of less than about 7 micrometers.

15. The electret filter media of claim 14, wherein the meltblown thermoplastic microfibers have an effective fiber diameter of at least about 3 micrometers.

16. The electret filter media of claim 13, wherein the thermoplastic microfibers have been subjected to corona treatment and to water contact to impart trapped charge to the web.

17. A filtration face mask adapted to cover the nose and mouth of a wearer, the mask having a filter element positioned on the mask to filter air before being inhaled, the filter element comprising the electret filter media of claim 16.

18. A filtering face mask adapted to cover at least the nose and mouth of a wearer, the filtering face mask having an air filter element that includes the electret filter media of claim 1.

* * * * *

UNITED STATES PATENT AND TRADEMARK OFFICE
CERTIFICATE OF CORRECTION

PATENT NO. : 6,119,691

DATED : September 19, 2000

INVENTOR(S) : Seyed A. Angadjivand, et al.

It is certified that error appears in the above-identified patent and that said Letters Patent is hereby corrected as shown below:

Col. 12, line 6, delete the comma before "only".

Col. 15, line 13, "an" should read as --can--.

Signed and Sealed this

Eighth Day of May, 2001

*Attest:*

NICHOLAS P. GODICI

*Attesting Officer*    *Acting Director of the United States Patent and Trademark Office*